United States Patent [19]
Taylor et al.

[11] 4,254,988
[45] Mar. 10, 1981

[54] CONSTRUCTION FOR ISOLATING CRANE CAB OPERATOR FROM CAB MOVEMENT

[75] Inventors: Douglas P. Taylor, North Tonawanda; Raymond A. Piziali, Amherst, both of N.Y.

[73] Assignee: Tayco Developments, Inc., North Tonawanda, N.Y.

[21] Appl. No.: 967,429

[22] Filed: Dec. 7, 1978

[51] Int. Cl.³ ............................................. B60R 7/06
[52] U.S. Cl. .................................. 296/190; 180/89.12
[58] Field of Search ........................... 296/35 R, 190; 180/89.12; 248/317

[56] References Cited
U.S. PATENT DOCUMENTS

| | | | |
|---|---|---|---|
| 2,954,958 | 10/1960 | Sander | 248/317 |
| 3,271,029 | 9/1966 | Grudoski | 248/317 |

Primary Examiner—John J. Love
Assistant Examiner—John A. Carroll
Attorney, Agent, or Firm—Joseph P. Gastel

[57] ABSTRACT

A suspension for isolating the operator's seat in the cab of an overhead or gantry crane from various forces to which the cab is subjected including a base for mounting the seat, a plurality of cables for suspending the base from the frame of the cab to substantially isolate the base from the various vibratory, oscillatory and torsional forces applied to the cab, and shock absorbers connected between the base and the frame of the cab to dampen any oscillations of the base and to prevent the base from moving rotationally.

20 Claims, 7 Drawing Figures

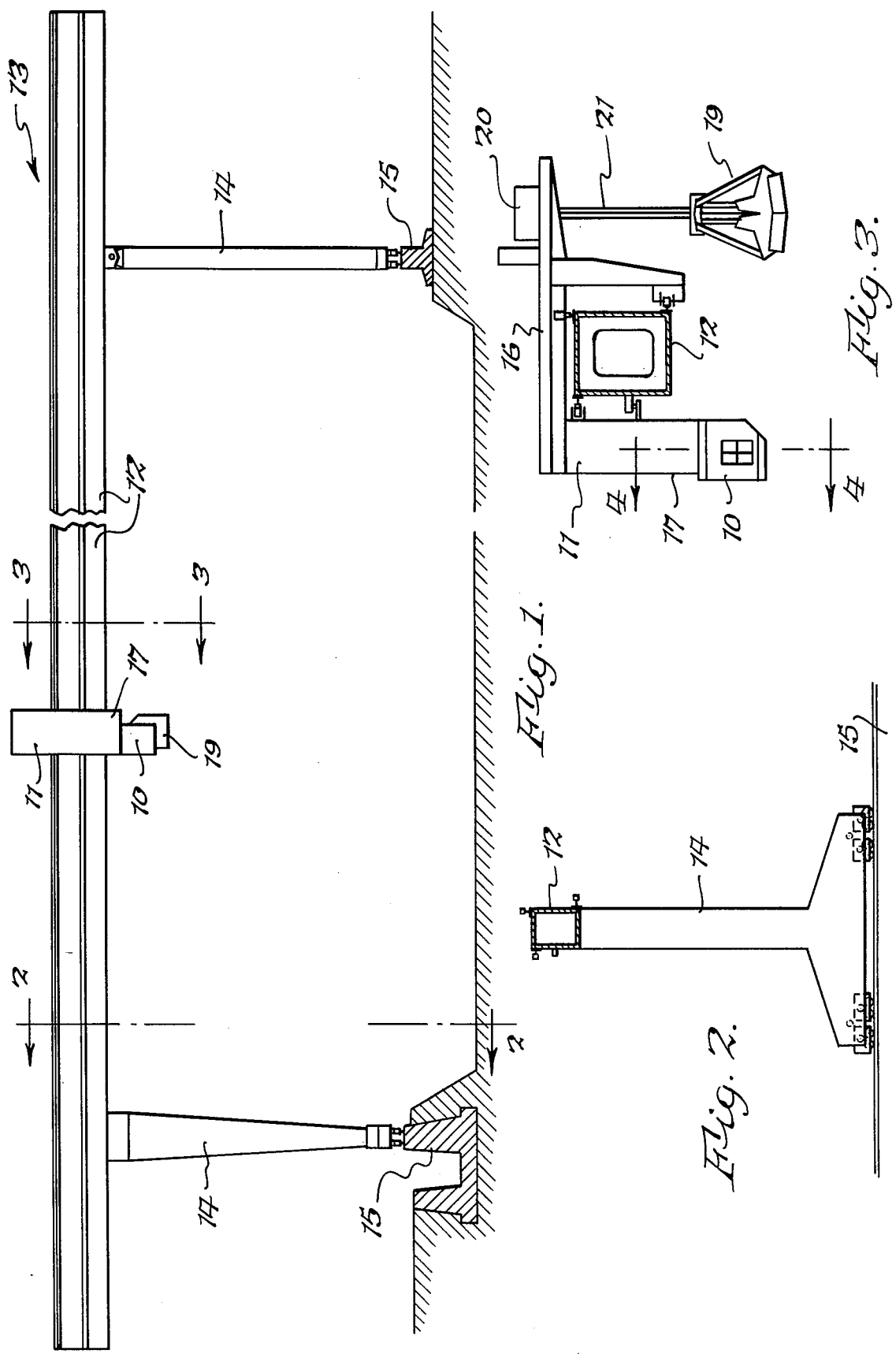

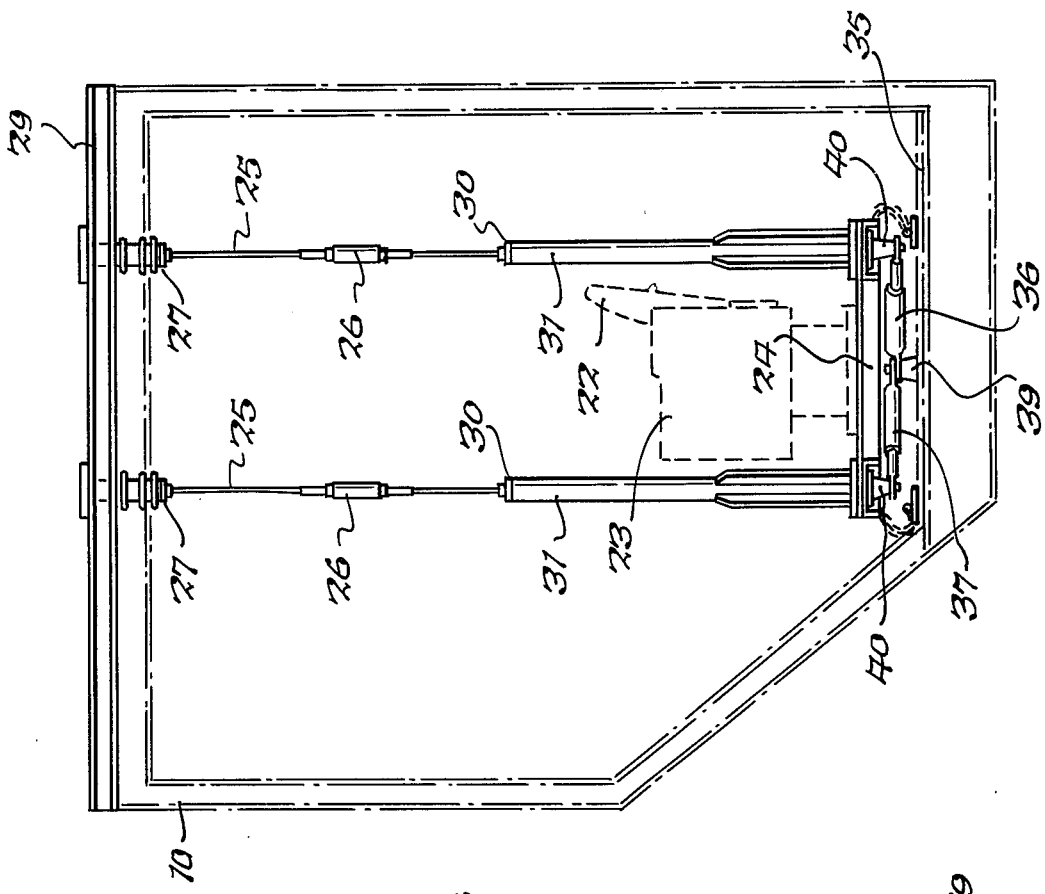
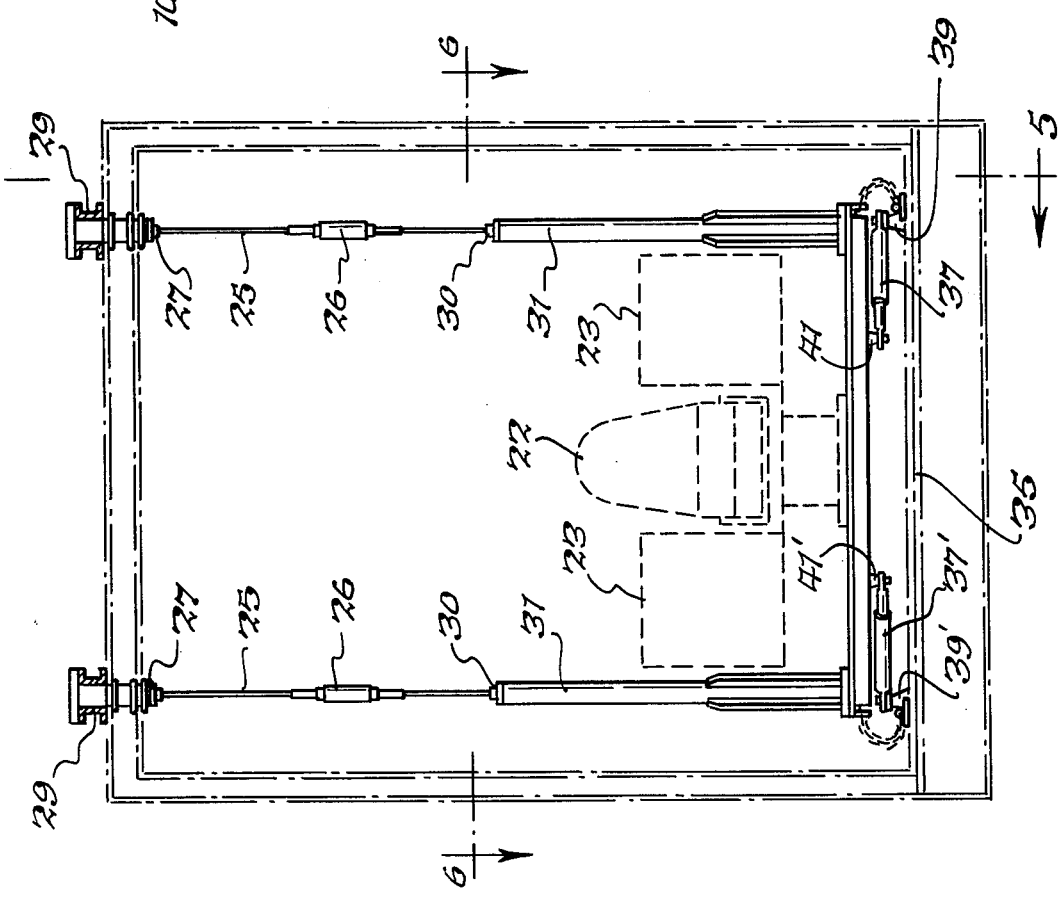

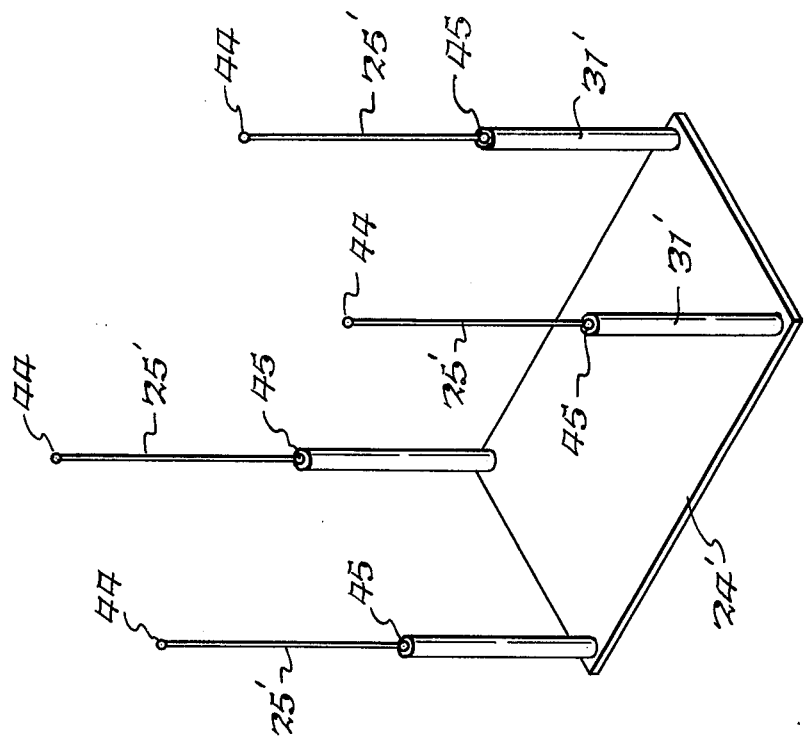
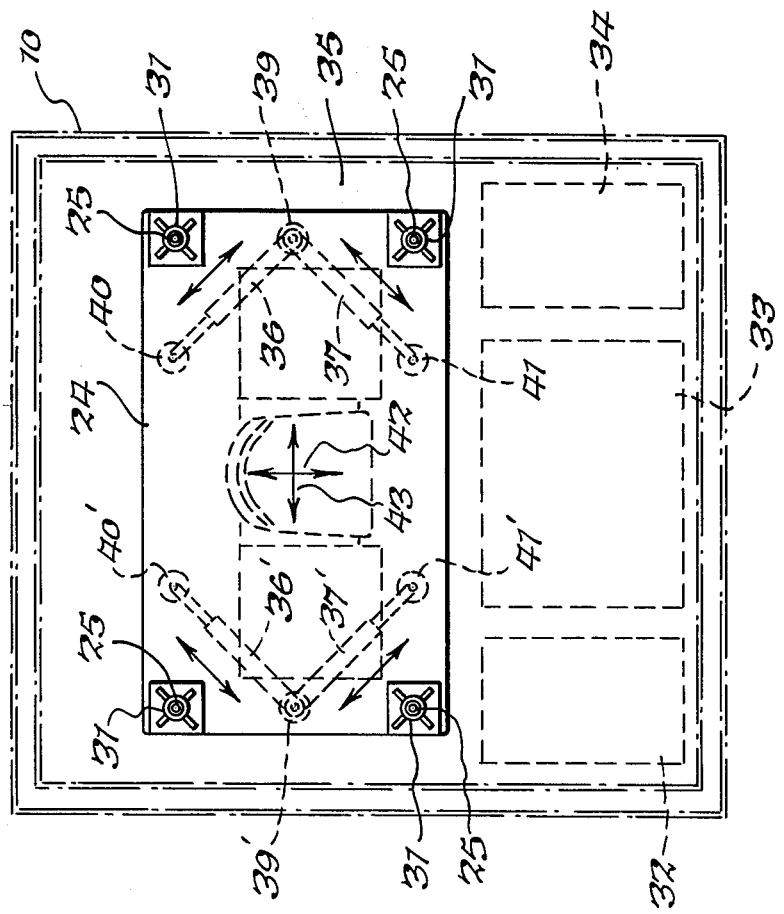

CONSTRUCTION FOR ISOLATING CRANE CAB OPERATOR FROM CAB MOVEMENT

BACKGROUND OF THE INVENTION

The present invention relates to a construction for isolating the operator's seat in a crane cab from the normal vibrational, oscillatory and torsional movements to which the operator's cab is subjected.

By way of background, in the past overhead and gantry cranes used for ore bridges and the like included a girder structure made of steel lattice work which provided very little wind resistance and had great strength. Therefore, the trolley which was carried by the girder structure did not move in such a manner during operation so as to transmit extremely objectionable vibrational and oscillatory movement to the cab in which the crane operator was located. However, in recent years, box girders have replaced the lattice girders of prior cranes because box girders are less expensive. However, box girder bridge designs yield substantially lower natural frequencies of oscillation than lattice constructions. In many cases, this natural frequency is in the 2-10 Hertz range which causes discomfort to human beings. These natural frequencies are caused by the swaying and resonating of the box girder, so that the operator's cab, which is mounted on the trolley, is caused to vibrate and oscillate, much to the above-mentioned discomfort of the crane operator. The excitations causing these vibrations and oscillations include the wind, the trolley running over joints in the track on which it is mounted, the braking and accelerating of the trolley, and the twisting of the box girder. The present invention is directed to a construction for preventing the above-described vibrational and oscillatory movements from reaching the crane operator located in the cab.

SUMMARY OF THE INVENTION

It is the object of the present invention to provide a suspension for an operator in a crane cab which will effectively isolate him from the various vibrational and oscillatory forces to which the cab is subjected in operation. Other objects and attendant advantages of the present invention will readily be perceived hereafter.

The present invention relates to a suspension for an operator's seat in a crane cab having upper and lower frame portions comprising base means for mounting said seat, pendulum suspension means for suspending said base means from said upper frame portion, said pendulum suspension means being of a length to attenuate the transmission of the oscillation of the crane cab to said operator's seat. In its preferred form, shock absorbers are connected between said base means and said cab to prevent said base means from oscillating in a rotational mode. The various aspects of the present invention will be more fully understood when the following portions of the specification are read in conjunction with the accompanying drawings wherein:

BRIEF DESCRIPTION OF THE DRAWINGS

FIG. 1 is a fragmentary side elevational view of a gantry crane mounting a trolley;

FIG. 2 is a cross sectional view taken substantially along line 2—2 of FIG. 1 and showing the box girder construction and the side frame of the crane;

FIG. 3 is a cross sectional view taken substantially along line 3—3 of FIG. 1 and showing the trolley mounted on the cross beam;

FIG. 4 is a cross sectional view taken substantially along line 4—4 of FIG. 3 and showing the manner in which the operator's seat is suspended within the cab of the trolley;

FIG. 5 is a cross sectional view taken substantially along line 5—5 of FIG. 4;

FIG. 6 is a cross sectional view taken substantially along line 6—6 of FIG. 4 and showing the orientation of the shock absorbers between the base on which the operator's seat is mounted and the frame of the cab; and FIG. 7 is a perspective view of a modified form of base.

DESCRIPTION OF THE PREFERRED EMBODIMENTS

The operator's suspension is for use in cab 10 forming a part of trolley 11 which is suitably mounted for reciprocating movement on box girder 12 of gantry crane 13 having side frames 14 which roll on spaced tracks 15. Trolley 11 includes a cross beam 16 from which cab 10 is suitably suspended by structural member 17 on one side of box girder 12, and from which a mechanical shovel 19, or the like, is connected to winch 20 by cables 21 on the other side of box girder 12. All of the foregoing structure, as heretofore described, is conventional in the art.

Box girder 12 may have a length of between 60 to 300 feet between side frame members 14, which may be about 30 to 75 feet high. Furthermore, the box girder 12 may have a height of about 8 to 15 feet and a width of about 5 to 12 feet. The trolley 11 can weigh up to 500,000 pounds and the cab portion 10 thereof weighs about 10,000 pounds.

In operation, cab 10 is subjected to movement in a rotational mode about the longitudinal axis of box girder 12, in addition to its normal movement longitudinally thereof. In the foregoing respect, due to its inherent construction, box girder 12 may twist an amount of plus or minus 1 to 3 inches about its longitudinal axis. This is translated into a horizontal swinging movement at cab 10 because of the orientation between cab 10 and box girder 12, as shown in FIG. 3. In addition, there are joints in the rails on which the trolley travels, and when the wheels of the trolley pass over these joints, there is a vibratory movement imparted to cab 10. Furthermore, when a load is being lifted by mechanical means 10, there is a tendency for box girder 12 to twist which in turn causes a further horizontal swinging movement of cab 10. Cab 10 is also subjected to a certain amount of movement in a direction transverse to the longitudinal axis of box girder 12. In this respect, whenever trolley 11 is braked or accelerated, there is a tendency for cab 10 to swing into and out of the plane of the drawing in FIG. 3. In addition to all of the foregoing, the wind effect on box girder 12 and trolley 11 will tend to move cab 10.

The net result of all of the foregoing factors is that cab 10 is subjected to a compound motion which is the sum total of all of the rotational, vibratory, and oscillatory movements of the box girder and the trolley, and this sum total is the vibration spectrum the cab is subjected to. This type of movement has in the past caused the crane operator in cab 10 to experience a combination of sea sickness and air sickness, considering that he is suspended well above the ground.

In accordance with the present invention, the operator's seat 22 is substantially isolated from the above-described movement of cab 10 to a great degree, thereby tending to eliminate the effect of the above-described compound movements of cab 10 on the operator in seat 22, which is located between consoles 23 containing the various controls utilized by the operator for controlling trolley movement. This isolation is primarily achieved by mounting the operator's seat 22 on a base or platform 24 which is suspended by a plurality of cables 25 so as to produce what is known as a pendulum suspension. In this respect, it is to be noted that pendulum platforms per se are generally known, but they have not heretofore been used to attenuate movement of the operator's seat in a crane cab.

In accordance with the present invention, the frequency spectrum of the cab is observed under various operational conditions, and a natural frequency is selected for the pendulum suspension such that said frequency is much lower than that of any of the input frequencies. This will isolate the platform from the input frequencies. The net result is to provide a low natural frequency of the operator's seat in a range found unobjectionable to humans. For example, if a pendulum cable length of 40 inches were selected, the natural frequency of the pendulum system would be $\frac{1}{2}$ cycle per second ($\frac{1}{2}$ Hertz). If this system was subjected to cab vibration in the 5–10 cycle per second range, the operator's seat would experience almost complete isolation, that is, over 99% amplitude reduction. In other words, if the cab is oscillating horizontally relative to the ground $\pm 2$ inches at 5 cycles per second, the platform or base 24 would be almost completely isolated and would not move relative to the ground more than $\pm 0.02$ inches, thereby providing exceptional operator comfort. At this point it is to be noted that the per se imposition of a forced frequency over a natural frequency to attenuate the amplitude of the forcing function is not novel.

The spacing of the pendulum cables with respect to one another is extremely important. If the cables were placed too close together, the platform would have a tendency to twist and the platform would experience rotational motion. By spacing the cables properly, the natural frequency of the platform in rotation can be made much higher than its frequency in linear motion, thereby inducing the platform to move almost entirely in a linear fashion.

The length of cables 25 is adjusted by the use of turnbuckles 26 which are located approximately midway on each of the cables. The upper ends of the cables are attached to fittings 27 which are rigidly secured to rails 29 which mount cab 10. The lower ends of each of the cables are attached at 30 to the tops of columns 31, the lower ends of which are rigidly secured to platform 24. Preferably, the connections between cables 25 and fittings 27 and columns 31 is by means of ball joints to minimize wear of the cables. It is to be especially noted that the crane operator sitting in seat 22 does not see cables 25, as they are above his line of sight. This is a psychological factor to provide the operator with the mental security of being supported by rigid columns 31, inasmuch as only these are within his normal line of sight. Thus, in operation, the crane operator will sit in seat 22, observe that which is going on below him through windows 32, 33 and 34, and control the movement of the trolley and the hoisting mechanism by means of controls on consoles 23.

The above-described pendulum platform structure removes substantially all of the unwanted movement from the operator's seat 22. To dampen oscillation of platform 24 under transient inputs, such as shocks, starting and stopping of the crane, etc., shock absorbers or dampers are affixed between base or platform 24 and the frame portion 35 of cab 10. In this respect, one pair of shock absorbers 36 and 37 have first ends pivotally mounted on post 39 secured to the frame 35. The opposite ends of shock absorbers 36 and 37 are pivotally mounted on posts 40 and 41, respectively, on base 24. The longitudinal axes of shock absorbers 36 and 37 extend at an angle of 90 degrees to each other. A second set of shock absorbers 36' and 37' are mounted at the opposite end of base or platform 24 in mirror-image relationship to shock absorbers 36 and 37. First ends of shock absorbers 36' and 37' are pivotally mounted on post 39' on frame 35. The other ends of shock absorbers 36' and 37' are pivotally mounted on posts 40' and 41' on base 24. The longitudinal axes of shock absorbers 36' and 37' extend at right angles to each other.

The shown orientation of shock absorbers 36, 37, 36' and 37', as described above, provides greater resistance to rotation of platform 24 about an axis perpendicular thereto and at its center of rotation than resistance to movement in the direction of arrows 42 and 43. Therefore, base or platform 24 will move in the direction of arrows 42 and 43 and not rotationally. Stating the foregoing in another way, the vector of each shock absorber horizontally in FIG. 6 is 0.707 times the force which the shock absorber can oppose along its longitudinal axis. Therefore, the sum of all four shock absorbers in either direction is four times 0.707 or 2.828 times the output of any shock along its centerline. The same is true of the vectors working vertically in FIG. 6 for all the shock absorbers. However, the force which the shock absorbers can output in a rotational mode is much greater, inasmuch as in a rotational mode, the shock absorbers act substantially along their longitudinal axes so that the opposing force produced by the shock absorbers approaches 4.0, that is, they tend to resist, with all their resistance, rotation of platform 24. Because the resistance produced by the shock absorbers against rotation of platform 24 is greater than the resistance which they exert against translational movement, any movement of platform 24 will be in a translational mode, rather than in a rotational mode. This eliminates operator discomfort by assuring that only linear platform motion will occur.

By way of specific example, in a particular installation, the length of columns 31 is 47" and the length of cables 25 is 38". Platform 24 is 66" by 38", and the columns are located substantially at the corners thereof. The figures are drawn substantially to scale. By means of turnbuckles 26 the cables 25 may be shortened or lengthened by $3\frac{1}{2}$".

In the foregoing system, as described above, the frequency spectrum of the cab varies between 1 cycle per second and 10 cycles per second. The box girder can twist with an amplitude of plus or minus 3 inches. In other words, the cab floor can oscillate in a horizontal direction up to 10 cycles per second and it can move back and forth a distance of up to 6 inches. Substantially all of the foregoing motion is attenuated by the combination of the pendulum suspension and the shock absorbers.

A modified form of the present invention is disclosed wherein base platform 24' has columns 31' extending upwardly therefrom. However, members 25' differ from flexible cables 25 in that they are steel rods having balls 44 at their upper ends and balls 45 at their lower ends for mating connections with ball sockets in which they are received. If desired, rods 25' may incorporate a turnbuckle such as 26 of FIG. 5.

It can thus be seen that the operator's suspension of the present invention is manifestly capable of achieving the above-enumerated objects and while preferred embodiments have been disclosed, it is to be understood that the present invention is not to be limited thereto but may be otherwise embodied within the scope of the following claims.

What is claimed is:

1. A crane cab suspension for isolating an operator's seat in a crane cab having upper and lower frame portions from vibrational movements of said crane cab comprising base means for mounting said seat, and pendulum means suspending said base means from said upper frame portion, said pendulum means being of a length to have a natural frequency which is lower than the frequency of vibrational movements of the crane cab to thereby effect attenuation of the transmission of crane cab vibration to said operator's seat.

2. A suspension as set forth in claim 1 wherein said pendulum means comprise a plurality of flexible cables.

3. A suspension as set forth in claim 2 wherein said plurality of cables comprise at least three cables having upper and lower ends, and wherein said base has a longer side and a shorter side, and wherein said cables are substantially parallel to each other, and wherein said cables have their upper ends connected to said upper frame portion, and coupling means for coupling at least two of said lower ends to the corners of said base for supporting said base.

4. A suspension as set forth in claim 3 wherein said coupling means comprise a plurality of rigid columns.

5. A suspension as set forth in claim 1 wherein said pendulum means is oriented to provide a rotational natural frequency to said base which is greater than the frequency of said base in a linear direction.

6. A suspension as set forth in claim 1 including rigid column means effectively located between said pendulum means and said base.

7. A suspension as set forth in claim 6 including means for varying the length of said pendulum means.

8. A suspension as set forth in claim 1 wherein said pendulum means comprise at least three cable-like members.

9. A suspension as set forth in claim 8 including rigid columns extending upwardly from said base and having upper portions connected to said cable-like members.

10. A suspension as set forth in claim 9 including spherical bearings between said cable-like members and said upper frame portion.

11. A suspension as set forth in claim 1 including means for varying the length of said pendulum means.

12. A suspension for an operator's seat in a crane cab having upper and lower frame portions comprising base means for mounting said seat, pendulum means for suspending said base means from said upper frame portion, said pendulum means being of a length to effect attenuation of the transmission of crane cab oscillation to said operator's seat, and dampening means coupled between said base and said lower frame portion for dampening movement of said base.

13. A suspension as set forth in claim 12 wherein said dampening means are oriented to provide rotational dampening to said base which is greater than dampening in a linear direction.

14. A suspension as set forth in claim 12 wherein said dampening means comprise a plurality of elongated shock absorber members oriented to provide greatest resistance to rotational forces applied to said base.

15. A suspension as set forth in claim 14 wherein said shock absorbers comprise at least two shock absorbers with each shock absorber having first and second ends, and wherein said base has first and second sides, and wherein said first ends of said shock absorbers are positioned along the central portion of at least one of said first sides of said base, and wherein said second ends of said shock absorbers are positioned along at least one of said second sides of said base.

16. A suspension as set forth in claim 15 including means for varying the length of said pendulum means.

17. A suspension as set forth in claim 14 wherein said shock absorbers have first ends connected to said base and second ends connected to said lower frame portion, said shock absorbers comprising a plurality of pairs, with the shock absorbers of each pair diverging relative to each other.

18. A suspension as set forth in claim 17 wherein said base has longer sides and shorter sides, and wherein said second ends of each pair of shock absorbers are connected to a common point on said lower frame portion substantially midway of the shorter sides of said base, and wherein said first ends of each pair of shock absorbers are connected to said base along its longer sides, and wherein said seat is located on said base facing one of said longer sides.

19. A suspension as set forth in claim 17 wherein said base has first and second pairs of sides, and wherein said second ends of each pair of shock absorbers are connected to a common point on said lower frame portion substantially midway of said first pair of sides of said base, and wherein said first ends of each pair of shock absorbers are connected to said base along said second sides of said base.

20. A suspension as set forth in claim 12 wherein said dampening means comprise a plurality of shock absorbers.

* * * * *